Figure 1:
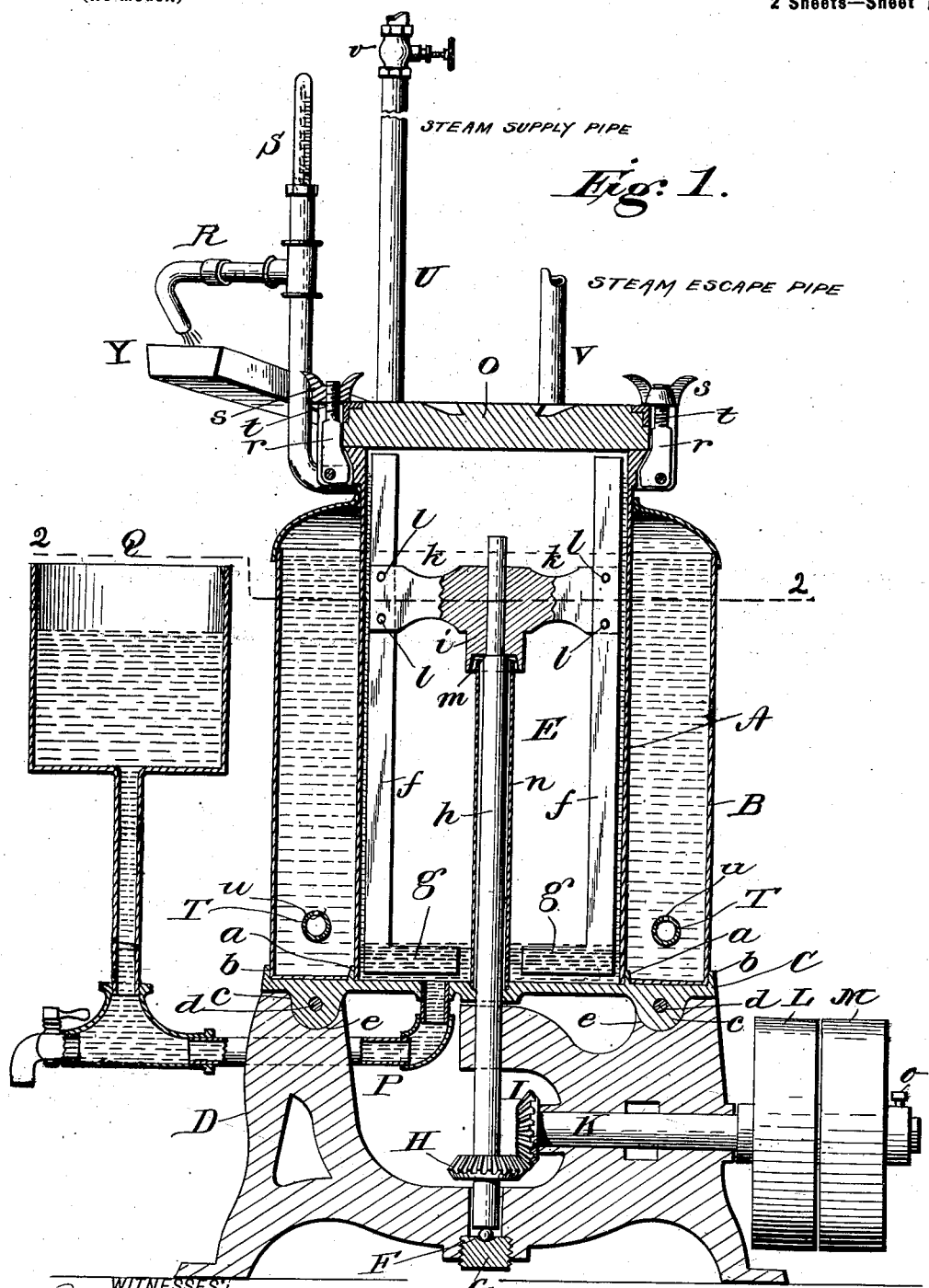

No. 642,535. Patented Jan. 30, 1900.
D. R. SNYDER.
APPARATUS FOR PASTEURIZING LIQUIDS.
(Application filed Apr. 4, 1899.)
(No Model.) 2 Sheets—Sheet 1.

No. 642,535. Patented Jan. 30, 1900.
D. R. SNYDER.
APPARATUS FOR PASTEURIZING LIQUIDS.
(Application filed Apr. 4, 1899.)
(No Model.) 2 Sheets—Sheet 2.
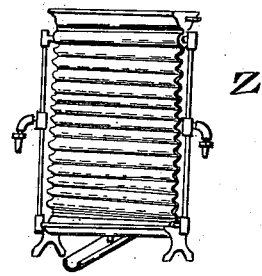
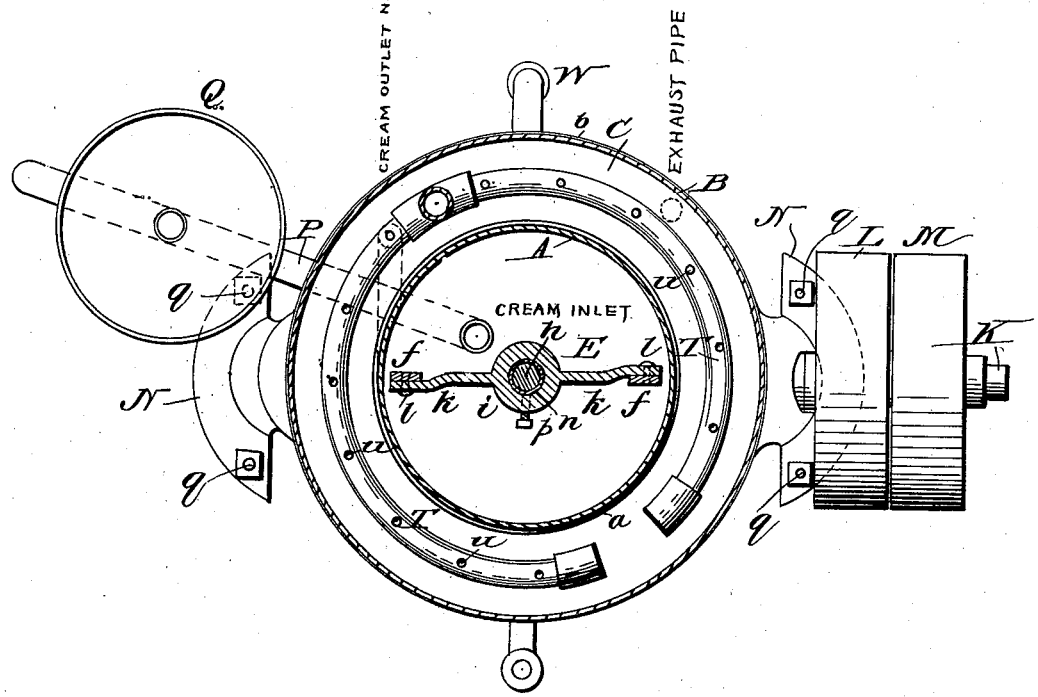

UNITED STATES PATENT OFFICE.

DANIEL R. SNYDER, OF STONERSVILLE, PENNSYLVANIA, ASSIGNOR OF THREE-FOURTHS TO HOWARD E. AHRENS AND JAMES S. AHRENS, OF READING, AND CHARLES M. RICHARDSON, OF BERNVILLE, PENNSYLVANIA.

APPARATUS FOR PASTEURIZING LIQUIDS.

SPECIFICATION forming part of Letters Patent No. 642,535, dated January 30, 1900.

Application filed April 4, 1899. Serial No. 711,720. (No model.)

*To all whom it may concern:*

Be it known that I, DANIEL R. SNYDER, a citizen of the United States, residing at Stonersville, in the county of Berks and State of Pennsylvania, have invented certain new and useful Improvements in Apparatus for Pasteurizing Liquids; and I do hereby declare the following to be a full, clear, and exact description of the invention, such as will enable others skilled in the art to which it appertains to make and use the same.

My invention relates to the apparatus for pasteurizing liquids, has especial reference to treating milk or cream, and consists in certain improvements which will be fully disclosed in the following specification and claims.

In the accompanying drawings, which form part of this specification, Figure 1 represents a vertical section of my improved apparatus for pasteurizing liquids; Fig. 2, a horizontal section on the line 2 2 on Fig. 1, and Fig. 3 a front elevation of a cooler.

Reference being had to the drawings and the letters thereon, A indicates the receptacle for the liquid to be treated, and B the receptacle for water to heat the liquid in receptacle A. The two receptacles are concentric and are secured to a base-plate or bottom C by soldering to the annular and concentric flanges $a$ $b$, respectively, and the base-plate is provided with two vertical lugs $c$ $c$, by which it is secured to the frame D by the bolts $d$ $d$, the lugs resting in recesses $e$ $e$, as shown in Fig. 1. Within the receptacle A is a dasher E, having vertical bars $f$ $f$, whose diameter approximates the internal diameter of the receptacle, leaving a narrow space between the outer edges of the bars and the wall of the receptacle, and extend from the upper end of the receptacle to the lower end and terminate in arms $g$ $g$, which extend inwardly almost to the shaft $h$, on which the dasher is supported by the hub or collar $i$, and from which extend horizontally arms $k$ $k$, which are secured to the bars $f$ $f$ by rivets $l$ $l$. The shaft $h$ is reduced in diameter at its upper end to form a shoulder $m$, on which the collar $i$ rests, and the shaft is surrounded by a tube $n$ to prevent leakage around the shaft where it passes through the bottom C.

The shaft $h$ is supported on a ball-bearing F on the step G in the lower end of the frame D, and on the shaft is a miter gear-wheel H, which meshes with a like gear-wheel I on shaft K, which is provided with pulleys L M, the former being loose on the shaft and the latter secured thereto by a set-screw $o$, and the dasher E is secured to the shaft $f$ by a set-screw $p$.

Each leg of the frame is provided with a flange N, by which it is secured to the floor or a proper foundation by bolts $q$ $q$.

The receptacle A is provided with a detachable, preferably wooden, cover O, secured in position by swinging bolts $r$ and thumb-nuts $s$, which engage a ring $t$ on the cover, a supply-pipe P, which connects with the receptacle at its lower end and communicates with a receiving-tank Q, which is fed from any suitable source of supply, and a discharge-pipe R at its upper end, which is provided with a thermometer S to indicate the temperature of the liquid passing through the receptacle A.

The receptacle B is provided with a distributing-pipe T, having perforations $u$, through which steam is emitted throughout the body of water in the receptacle and heats the water therein uniformly as it flows through pipe U, having valve $v$, from any suitable source of supply, and the waste steam escapes from the receptacle through pipe V, and hot water may be drawn from the receptacle through faucet W.

The liquid discharged from the receptacle A through pipe R falls into a trough Y and may be then conducted to Z, which may be of any approved form of construction, before it is put into vats or receptacles for shipping.

The liquid is supplied to the receptacle A in a continuous stream, so that there is a body of the liquid in the bottom of the receptacle about an inch deep. Heat is applied to the water in the receptacle B until it reaches a temperature which will heat the liquid in receptacle A to a temperature of from 155° to 175° Fahrenheit and the dasher E set in operation and maintained at a speed of from three hundred and fifty to four hundred revolutions per minute. The liquid is thus violently agitated or beaten by the dasher and propelled around the wall of the receptacle as it rises therein in a thin sheet or stratum and is subjected to the heat of the water in the receptacle B to destroy all deleterious matter contained in the liquid and discharged at the upper end of the receptacle through pipe R.

In the treatment of milk or cream care must be taken not to heat it to the point of sterilization, or the natural taste of the milk or cream will be sacrificed. The milk or cream is then subjected to a cooling process and its temperature reduced from 63° to 53°, when it may be run into vats or receptacles for shipping. Milk or cream thus treated retains its natural taste and will remain sweet many days without the use of a refrigerating medium.

In the treatment of cream I prefer to receive the cream from any approved form of separator and run it through the pasteurizer as fast as it flows from the separator.

Having thus fully described my invention, what I claim is—

1. Apparatus for pasteurizing milk or cream, consisting of a cream-receptacle, means for agitating or beating the cream and converting it into a thin sheet or stratum, a surrounding water-receptacle, means for heating the water, a base or bottom for said receptacles having annular flanges and depending lugs; in combination with a frame supporting the receptacles and to which said lugs are secured.

2. Apparatus for pasteurizing milk or cream, consisting of a cream-receptacle provided with a revoluble dasher approximating the diameter of said receptacle and having inwardly-extending arms at the lower end, a supply-pipe at the lower end of the receptacle, a discharge-pipe at the upper end thereof, a surrounding water-receptacle, a perforated distributing-pipe, and a steam-supply pipe; in combination with a base or bottom for said receptacles having annular flanges on the upper side to which the receptacles are secured, and depending lugs on the opposite side, a frame having recesses in the upper end thereof and in which said lugs are secured, a dasher-shaft and a driving-shaft supported by said frame.

3. Apparatus for pasteurizing milk or cream, consisting of a cream-receptacle, a dasher for agitating or beating the cream and converting it into a thin sheet or stratum, a surrounding water-receptacle, means for heating said water, a base or bottom for said receptacles having annular and concentric flanges to which said receptacles are secured, and depending lugs; in combination with a frame supporting the receptacle and to which said lugs are secured, a shaft supporting the dasher and said shaft supported at its lower end on a step in said frame, and provided with a miter gear-wheel, and a driving-shaft connected to the dasher-shaft by a miter gear-wheel and supported by said frame.

In testimony whereof I affix my signature in presence of two witnesses.

DANIEL R. SNYDER.

Witnesses:
W. A. WANNER,
C. M. RICHARDSON,